UNITED STATES PATENT OFFICE.

ELTON R. DARLING, OF MONTCLAIR, NEW JERSEY, ASSIGNOR TO ELLIS-FOSTER COMPANY, A CORPORATION OF NEW JERSEY.

PRODUCTION OF BISMUTH.

1,318,335.     Specification of Letters Patent.     Patented Oct. 7, 1919.

No Drawing.     Application filed January 2, 1919. Serial No. 269,351.

*To all whom it may concern:*

Be it known that I, ELTON R. DARLING, a citizen of the United States, residing at 86 Greenwood Ave., Montclair, in the county of Essex and State of New Jersey, have invented certain new and useful Improvements in the Production of Bismuth, of which the following is a specification.

This invention relates to a method of making relatively pure bismuth metal from concentrates containing bismuth especially concentrates as run 80 to 95% of bismuth with various percentages of sulfur and tellurium.

The process is applicable to concentrates containing bismuth in metallic state and also to those yielding the metal on suitable heat treatment.

In carrying out my process I may proceed in the following illustrative manner. The concentrate is heated to about 1700° F. or a bright red heat and a certain amount of sulfur and also tellurium if present volatilizes while a slag which usually contains iron forms and floats on the surface preventing oxidation during the initial heating stage. This slag may be run off or it may be separated in the following manner: Cool the crucible or other container in which the melt is being carried out and when the temperature has dropped 500° or so the slag sets and may be stripped from the surface of the bismuth metal. On re-heating, if sulfur and impurities such as tellurium are present in the metal these are usually indicated by a purple tint which the surface of the molten metal exhibits. To remove such impurities I prefer to treat with a salt of the nature of calcium chlorid or magnesium chlorid which has the double function of furnishing chlorin for the purpose of volatilizing iron impurities and of taking up the sulfur as calcium or magnesium sulfite. The use of such natural salts has the advantage that desulfurization may take place without the crucible or lining of the hearth, etc., being attacked as would be the case if more drastic reagents were employed. Ordinarily from 5 to 10% of calcium chlorid by weight reckoned on the yield of bismuth is employed for desulfurizing purposes and for the removal of metallic impurities which form volatile chlorids. The reaction takes place readily at a bright red heat and after its completion the metal may be drawn off and run into molds.

In place of calcium and magnesium chlorid any similar reactive saline body, preferably of a neutral character may be employed.

What I claim is:—

1. The process of producing pure bismuth metal from high grade bismuth concentrates which comprises heating and slagging off a portion of the impurities and then reacting on the remaining metal with a chlorid of an alkaline earth.

2. The process of treating bismuth concentrates which comprises reacting on partially purified bismuth metal containing sulfur with 5 to 10%, by weight, of calcium chlorid at a bright red heat.

3. The process of treating bismuth concentrates which comprises reacting theron at a bright red heat with reagent comprising a chlorid of an alkaline earth.

4. The process of purifying bismuth which comprises reacting on the impure metal in a molten state with calcium chlorid whereby impurities form volatile chlorids and are removed and sulfur and tellurium unite with calcium and are separated from the metal.

5. In the process of refining bismuth the step which comprises reacting on the molten metal with a substantially neutral compound of an alkaline earth capable of reacting with the impurities therein and of separating them from the metal.

ELTON R. DARLING.